United States Patent Office.

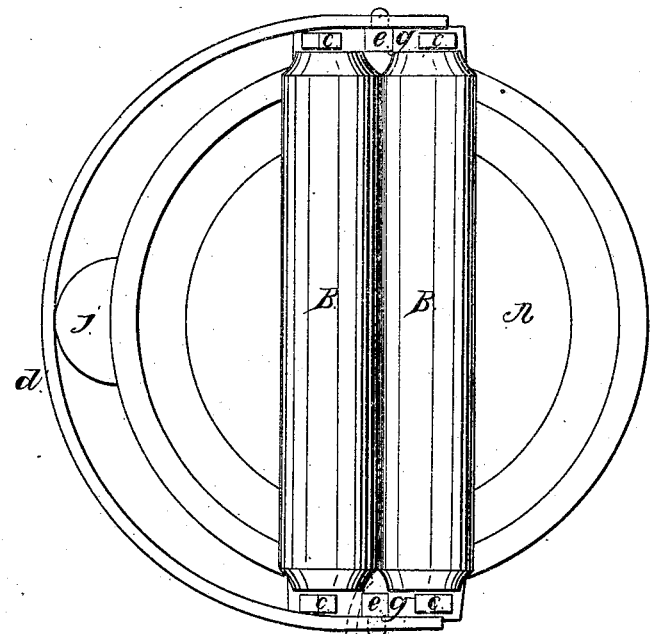
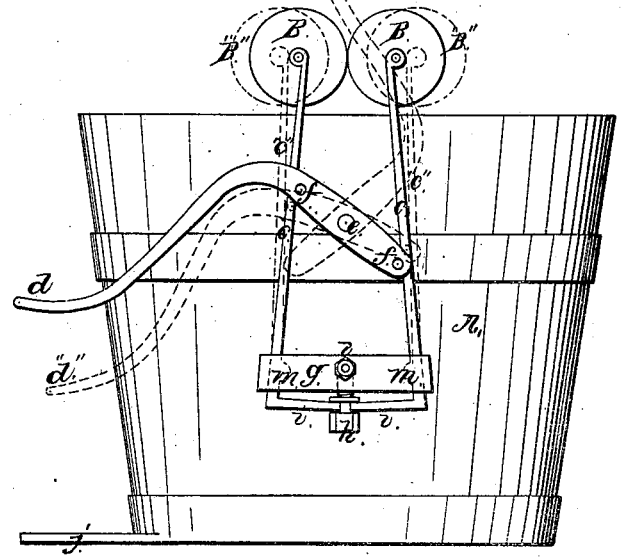

ELI H. LORD, OF HOMER, AND EGBERT HINMAN, OF SYRACUSE, NEW YORK.

Letters Patent No. 68,447, dated September 3, 1867.

IMPROVED MOP-PAIL AND WRINGER.

*The Schedule referred to in these Letters Patent and making part of the same.*

TO ALL WHOM IT MAY CONCERN:

Be it known that we, ELI H. LORD, of the town of Homer, of the county of Cortland, and State of New York, and EGBERT HINMAN, of the city of Syracuse, and State of New York, have invented a new and useful improvement in Mop-Pail and Wringer; and we do hereby declare that the following is a full, clear, and exact description thereof, reference being had to the accompanying drawings, and to the letters of reference marked thereon.

The nature of our invention consists in providing a suitable pail with a pair of rollers, which can be separated, by means of the bail of the pail, in such a manner that the mop can be saturated with the contents of the pail, and then can be wrung dry, or nearly so, as the person using may wish to have it.

To enable others skilled in the art to make and use our invention, we will proceed to describe its construction and operation.

Figure 1 in the drawing is a top view.
Figure 2 is a side view.

B B are two rollers, standing over the top of the pail. A represents the pail. $d$ is the bail of the pail. $g$ is a stand, fastened to the side of the pail, held by the bolt I, supporting and holding the springs $c\ c$. $e$ is a stud, fastened in the side of the pail, on which the bail $d$ revolves. $c\ c$ are two springs, which form journals for the rollers B B. At the upper end, on the lower end of the springs $c\ c$, is a foot or projection, $z$. On the springs $c\ c$ there is a projection, as seen by the dotted lines $m\ m$, by which they are held and allowed to move in the stand $g$. In the bottom of the stand $g$ is a screw, $h$, which holds the ends of the springs $c\ c$. By raising or lowering the screws H we can govern the pressure of the rollers B B. In the bail $d$ are two pins $f\ f$, extending into the inside width of the springs $c\ c$.

By depressing the bail $d$ the pins $f\ f$ press against the springs $c\ c$, thereby separating the rollers B B, and showing them as represented by the dotted lines B B, and the bail as at $d$. For carrying the pail, the bail $d$ will rise up, as shown by the dotted lines K.

What we claim, and desire to secure by Letters Patent, is—

1. We claim the combination of the mop-pail with the springs $c\ c$, the adjustable rollers B B, the bail $d$, the screw $h$, the whole constructed and operated in the manner described.

2. We claim the bail $d$, both for the purpose of a bail, and also for a lever, for the purpose of separating the rollers, in the manner described.

ELI H. LORD,
EGBERT HINMAN.

Witnesses:
HARRY GIFFORD,
THOMAS BYRNE.